United States Patent
Beiter et al.

(10) Patent No.: US 9,798,888 B2
(45) Date of Patent: Oct. 24, 2017

(54) DATA MANAGEMENT (71) Applicant: HEWLETT-PACKARD DEVELOPMENT COMPANY, L.P., Houston, TX (US)

(72) Inventors: Michael Bernd Beiter, Fort Collins, CO (US); Siani Pearson, Bristol (GB); Marco Casassa Mont, Bristol (GB); Liqun Chen, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 36 days.

(21) Appl. No.: 14/787,835

(22) PCT Filed: Jul. 30, 2013

(86) PCT No.: PCT/US2013/052646
§ 371 (c)(1),
(2) Date: Oct. 29, 2015

(87) PCT Pub. No.: WO2015/016828
PCT Pub. Date: Feb. 5, 2015

(65) Prior Publication Data
US 2016/0078239 A1 Mar. 17, 2016

(51) Int. Cl.
*H04L 29/06* (2006.01)
*G06F 21/62* (2013.01)
*H04L 9/08* (2006.01)

(52) U.S. Cl.
CPC ........ *G06F 21/6209* (2013.01); *H04L 9/0838* (2013.01)

(58) Field of Classification Search
USPC ....................................... 713/164
See application file for complete search history.

(56) References Cited

U.S. PATENT DOCUMENTS 7,614,077 B2 11/2009 Brew
8,275,632 B2 9/2012 Awaraji et al.
(Continued)

FOREIGN PATENT DOCUMENTS

CN 101719205 9/2010
CN 101821747 9/2010
(Continued)

OTHER PUBLICATIONS

Bobba, R., et al., PBES: A Policy Based Encryption System with Application to Data Sharing in the Power Grid, ASIA CCS '09, Mar. 10-12, 2009, Sydney, NSW, Australia, 14 pages.
(Continued)

*Primary Examiner* — Jason Lee
(74) *Attorney, Agent, or Firm* — Hewlett Packard Enterprise Patent Department (57) ABSTRACT

An example method for managing data in accordance with aspects of the present disclosure includes receiving from a user in the computer network environment a policy about how a piece of data should be treated, an encryption of the piece of data, a signature of a cryptographic hash of the policy and a cryptographic key, requesting from a trust authority the cryptographic key to access the piece of data, transmitting an encryption of at least one share to the trust authority, wherein the at least one share is created by and received from the trust authority, receiving from the trust authority the cryptographic key, wherein the cryptographic key is recreated by a combiner using a subset of the at least one share, shares associated with the trust authority and shares associated with the combiner, and decrypting the encryption of the piece of data using the recreated cryptographic key.

16 Claims, 4 Drawing Sheets (56) References Cited

U.S. PATENT DOCUMENTS

| | | |
|---|---|---|
| 8,327,451 B2 | 12/2012 | Duri et al. |
| 2005/0251680 A1* | 11/2005 | Brown ................. H04L 63/061 713/171 |
| 2009/0097660 A1 | 4/2009 | Malaviarachchi et al. |
| 2010/0077214 A1 | 3/2010 | Jogand-Coulomb et al. |
| 2010/0299313 A1 | 11/2010 | Orsini et al. |
| 2011/0055559 A1 | 3/2011 | Li et al. |
| 2011/0283335 A1* | 11/2011 | Bussard ............ G06F 17/30684 726/1 |
| 2012/0260094 A1 | 10/2012 | Asim et al. |
| 2012/0297441 A1 | 11/2012 | Boldyrev et al. |
| 2012/0321086 A1 | 12/2012 | D'Souza et al. |
| 2014/0095886 A1* | 4/2014 | Futral ................... G06F 21/572 713/187 |
| 2014/0119540 A1* | 5/2014 | Pearson ................ H04L 9/0825 380/44 |

FOREIGN PATENT DOCUMENTS

| | | |
|---|---|---|
| CN | 101917267 | 12/2010 |
| WO | WO-2013009290 A1 | 1/2013 |

OTHER PUBLICATIONS

International Search Report & Written Opinion, Apr. 28, 2014, PCT Patent Application No. PCT/US2013/052646, 11 pages.

* cited by examiner

DATA MANAGEMENT

BACKGROUND

As the Internet gains popularity, more and more services are made available online, inviting users to disclose more private information to the service providers. However, lack of trust about privacy and security practice is a key inhibitor in moving to cloud models. For example, when sharing and storing information in the cloud, additional assurance is needed that appropriate measures have been taken by cloud service providers (CSPs) to protect and handle the data, according to legislation, security practice and users' (data subjects') requirements. Both business consumers and citizens are requiring more control over the usage and sharing of their personal and confidential information.

In order to keep such sensitive data secure, on-line applications and services often store such sensitive data in a cryptographically protected (e.g. encrypted and/or signed) format. In addition, previous work on sticky policies, where policies and constraints are attached to data (by using cryptographic public-key mechanisms) and dictate data handling criteria, can serve as the basis for policy compliance, enforcement and auditing. Further, cryptographic algorithms may use encryption keys to encrypt data. Specifically, an encryption key may determine the functional output of a cryptographic algorithm.

BRIEF DESCRIPTION OF THE DRAWINGS

Example implementations are described in the following detailed description and in reference to the drawings, in which.

DETAILED DESCRIPTION

Various implementations described herein are directed to a data management system. More specifically, and as described in greater detail below, various aspects of the present disclosure are directed to a methodology by which machine readable policies that stick to data to define allowed usage and obligations as data travels across multiple parties using a set of secret sharing schemes.

Aspects of the present disclosure described herein utilize the definition of a set of secret sharing schemes to augment the usage of public key cryptography as the cryptographic backbone of the scheme. Moreover, the aspects of the present disclosure described herein focuses on utilizing secret sharing scheme where multiple trust authorities (TAs) are employed. Accordingly, the approach described herein scales across multiple control domains, and the users' preferences and policies on how to handle data are propagated and enforced across a chain of data disclosures within multiple cloud services platforms. Moreover, this approach enhances user control and provides accountability within cloud environments, removing business barriers in the sense that organizations might be willing to move more of their sensitive operation to the cloud model. The user has control about the destiny, usage and management of their data, once disclosed to a cloud service provider.

Further, aspects of the present disclosure described herein uses a combiner driven secret sharing scheme, where the combiner needs to contribute at least one share for each recreation operation performed to recreate the key to access the private data. Among other things, this approach may significantly enhances the security level, as it is sufficient to destroy, disable, or restrict the combiner to prevent any further access to the information.

In one example in accordance with the present disclosure, a method for managing data is provided. The method comprises receiving from a user in the computer network environment a policy describing permissible use of piece of data, an encryption of the piece of data, a signature of a cryptographic hash of the policy and a cryptographic key, requesting from a trust authority the cryptographic key to access the piece of data, transmitting an encryption of at least one share to the trust authority, wherein the at least one share is created by and received from the trust authority, receiving from the trust authority the cryptographic key, wherein the cryptographic key is recreated by a combiner using a subset of the at least one share, shares associated with the trust authority and shares associated with the combiner, and decrypting the encryption of the piece of data using the recreated cryptographic key.

In another example in accordance with the present disclosure, a system is provided. The system comprises a communication module to receive via a computer network environment a policy describing permissible use of piece of data, an encryption of the piece of data, a signature of a cryptographic hash of the policy and a cryptographic key, request from a trust authority the cryptographic key to access the piece of data, transmit an encryption of at least one share to the trust authority, wherein the at least one share is created by and received from the trust authority, and receive from the trust authority the cryptographic key, wherein the cryptographic key is recreated by a combiner using a subset of the at least one share, shares associated with the trust authority and shares associated with the combiner, and a cryptographic module to decrypt the encryption of the piece of data using the recreated cryptographic key.

In a further example in accordance with the present disclosure, a non-transitory computer-readable medium is provided. The non-transitory computer-readable medium comprises instructions that when executed cause a device to (i) receive a policy describing permissible use of piece of data, an encryption of the piece of data, a signature of a cryptographic hash of the policy and a cryptographic key, (ii) request from a trust authority the cryptographic key to access the piece of data, and (iii) receive from the trust authority the cryptographic key, wherein the cryptographic key is recreated by a combiner using a subset of at least one share, shares associated with the trust authority and shares associated with the combiner, wherein the shares are created by and received from the trust authority.

Figure 1:
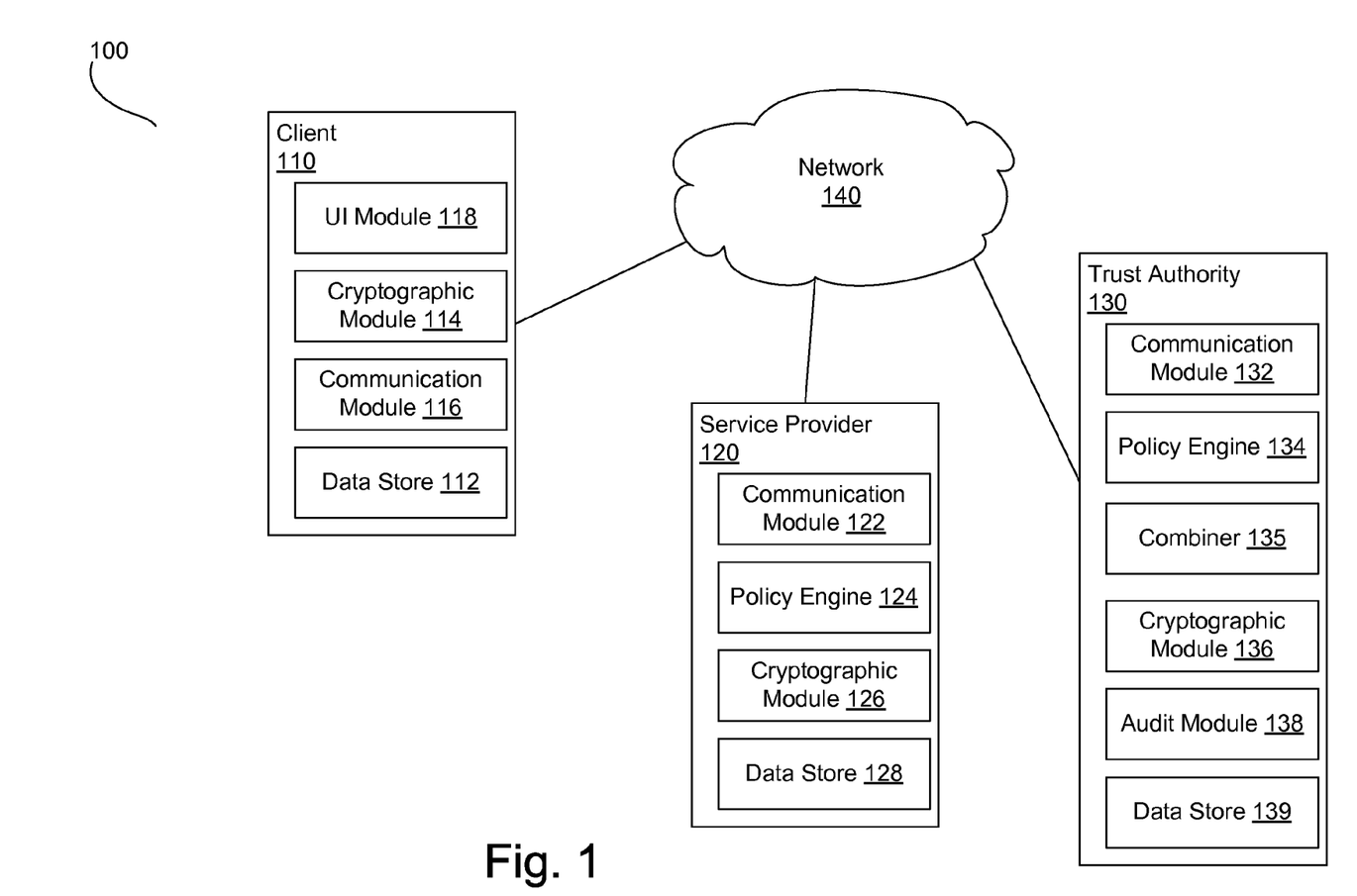
FIG. 1 illustrates an example network environment for ensuring data privacy to in accordance with an implementation.

FIG. 1 illustrates an example network environment 100 in which an owner of private data (e.g., confidential personal data such as health information, credit card numbers) can establish one or more privacy policies that describe conditions for accessing the private data and ensure that the privacy policies are enforced in the network environment 100 in accordance with an implementation. The network environment 100 includes a client 110, at least one service provider 120, and a trust authority 130, all connected through a network 140, each of which is described in greater detail below. It should be readily apparent that the network environment 100 depicted in FIG. 1 represents an illustration and that other components may be added or existing components may be removed, modified, or rearranged without departing from a scope of the present disclosure. For example, while the network environment 100 illustrated in FIG. 1 includes only one trust authority, the system may actually comprise a plurality of trust authorities, and only one has been shown and described for simplicity.

In one implementation, the client 110 is a computer system that includes a user interface (UI) module 118, a cryptographic module 114, a communication module 116, and a data store 112. The UI module 118 provides an interface (e.g., an interactive display window) for a user to define (or establish, generate) a privacy policy for a set of private data residing on (or that can be accessed at) the client 110. A privacy policy describes machine-readable conditions for treating (e.g., accessing, using) a set of private data that are to be followed. To ensure policy compliance, the client 110 generates one or more privacy policies for treating private data (or attributes of the private data), encrypts the private data, and transmits the encrypted data along with the privacy policies to the service provider 120.

The cryptographic module 114 encrypts a set of private data subject to a privacy policy into encrypted data by applying an encryption algorithm (e.g., a symmetric encryption algorithm as specified in ISO (International Standards Organization)/IEC (International Electrotechnical Commission) 18033-3) using a cryptographic key (e.g., a locally generated symmetric key), and generates a sticky policy (e.g., a signature of a cryptographic hash of the policy and the key) for the encrypted data to ensure that the corresponding privacy policy will be audited and assurance of policy compliance provided.

The communication module 116 communicates with the service provider 120 and the trust authority 130 through the network 140. The data store 112 stores data used by the client 110. Examples of the data stored in the data store 112 include private data and associated privacy policies. The data store 112 may be a database (e.g., a relational database) stored on a non-transitory computer-readable storage medium (e.g., a hard disk drive).

In one implementation, the service provider 120 may provide a service in the network environment 100 that utilizes private information provided by the client 110. In one example, the service provider 120 may include one or more computer systems configured to implement the service. In another example, the service may be implemented in a cloud computing environment. Cloud computing may refer to a style of computing in which dynamically scalable and often virtualized resources are provided as a service over the Internet. Thus, cloud computing customers may not own the physical infrastructure serving as host to the software platform in question, but instead rent usage of resources from a third-party provider, where consume these resources as a service and pay only for resources used. The service provider 120 may utilize services or functions of other entities (e.g., other service providers 120) to provide the service to the users.

The service provider 120 includes a communication module 122, a policy engine 124, a cryptographic module 126, and a data store 128. The communication module 122 communicates with the client 110 and the trust authority 130 through the network 140. Example communications include publishing a policy (a "Manifesto") including a list of supported conditions and trust authority 130, receiving from the client 110 encrypted data and sticky policies, transmitting to the trust authority 130 sticky policies or the assurance messages, and receiving from the trust authority 130 cryptographic keys or requests for the assurance messages.

In one implementation, upon receiving a sticky policy, the policy engine 124 may interpret a privacy policy in the sticky policy (e.g., according to a set of predetermined grammar rules and/or semantics rules) to determine whether the privacy policy is valid (e.g., whether expired, authentic) and whether conditions in the privacy policy is acceptable (e.g., whether the service provider 120 can satisfy all policy conditions). If the privacy policy is invalid or unacceptable, the policy engine 124 may work with the communication module 122 to transmit to the client 110 an error message or ignores the privacy policy and the associated encrypted data altogether. Otherwise (i.e., the privacy policy is valid and acceptable), the policy engine 124 may work with the communication module 122 to forward the sticky policy to an acceptable trust authority 130 (e.g., as listed in the privacy policy). The policy engine 124 may generate an assurance message including a statement claiming that all conditions in the privacy policy will be complied by the service provider 120 (the assurance statement) digitally signed with the private key of the service provider 120, and transmit the assurance message to the trust authority 130. The assurance message may be transmitted to the trust authority 130 together with the sticky policy or separately (e.g., the assurance message is generated and/or transmitted in response to a request from the trust authority 130 after the sticky policy is transmitted). In one implementation, the assurance message may be for a subset of the conditions in the policy. Once the private data is decrypted, the policy engine 124 may make sure that the conditions in the privacy policy are complied with according to the assurance given to the trust authority 130.

The data store 128 stores data used by the service provider 120. Examples of the data stored in the data store 128 include decrypted private data, associated privacy policies, and assurance messages sent to the trust authority 130. The data store 128 may be a database stored on a non-transitory computer-readable storage medium.

The cryptographic module 126 performs cryptographic functions such as verifying the integrity of the privacy policy, and decrypting the encrypted data using the cryptographic key provided by the trust authority 130.

In one implementation, the trust authority 130 may be used to provide compliance checking, enforcement and audit capabilities. The trust authority 130 ensures that a privacy policy for a set of private data will be complied with by the service provider 120 before providing the service provider 120 with access to the private data. The trust authority 130 also provides compliance checking capacities by generating an audit trail regarding the disclosure of the private data and attempted accesses to it. Similar to the service provider 120, the trust authority 130 may implement its functionality through one or more computer systems or in a cloud computing environment, and may utilize services or functions of other entities (e.g., an audit service provider) to provide its service/capacities. In one example, rather than the trust authority 130 being separate from the client 110, the client 110 can be arranged to run trust authority services itself in order to have firsthand understanding of what happens to its private data and make ultimate decisions about release of cryptographic keys. Additional or alternatively, the functions of the trust authority 130 may be implemented by the same computer systems or in the same cloud computing environment of the service provider 120.

As mentioned above, the network environment 100 utilizes secret sharing schemes, in which the key used to encrypt the private data may be divided into a plurality of shares. A share defines a part of the secret, and the secret is distributed in shares, such that any pre-defined combination of them can be used to reconstruct (e.g., recreate) the original key. The recreation operation of the secret from their shares may be performed to access the private data. Using any set of shares that is not on the pre-defined set of combinations may not help to reconstruct the key. More specifically, secret sharing schemes may be used to distribute a secret among a set of participants such that only authorized subsets of participants may recreate the shared secret. The set of all authorized subsets may be called the scheme's access structure. In one implementation, an authorized subset in an access structure may be defined as a set of participant that is allowed to recreate the secret. More specifically, an access structure where each superset of an authorized subset is authorized to recreate the secret may be called an access structure. In one implementation, the basic access structure may be defined such that either the client 110 alone, or both the trust authority 130 and at least one service provider 120 must participate during the recreation.

In one implementation, the trust authority 130 may comprise a combiner 135, which may be located within a tamper resistant device which can be physically located on the trust authority 130 side. The combiner 135 may be an additional trusted entity that can store a certain amount of private information. The combiner 135 as a trustworthy instance may be characterized by the fact that the combiner 135 may destroy the private information. In one implementation, the combiner 135 may be a part of the trust authority 130. In another implementation, the combiner 135 may be a stand-alone entity. The combiner 135 may be a trusted third party, or hosted by the client 110, or hosted by the service provider 120. The combiner 135 may need to contribute at least one share for each recreation operation. In one implementation, the combiner 135 may receive one or more sets of shares, which it may need to contribute during recreation. The shares that are assigned to the combiner 135 may be chosen such that the combiner 135's shares by themselves are not sufficient to recreate the secret. Further, by altering the combiner 135's shares, the key and existing participants' shares may be kept constant, even if the participant set changes, as well as to change the key without altering the participant's shares.

In some implementations, the encryption key received from the client 110 may be partitioned into shares. For example, the encryption key may be partitioned into a number of encryption key shares, N, and yet be capable of reconstruction from some number, K, of encryption key shares that is less than all of the N encryption key shares. More specifically, the trust authority 130 may create shares for the at least one service provider 120 after the trust authority 130 receives the encryption key from the client 110. Moreover, the trust authority 130 may compute a set of share for the combiner 135 and store the combiner 135 shares in the combiner 135. The shares may be changed during runtime by recomputing the combiner 135 shares. Further, the trust authority 130 may encrypt the shares for the service provider 120 with the service provider 120's public key and may distribute the result to the service provider 120. In another implementation, the shares may be calculated by the client 110.

In one implementation, the client 110 may request a share update from the trust authority 130. In another implementation, the service provider 120 may request a share update from the trust authority 130, and in such implementation, the client 110 may not need to interact with the request for the share update. In a further implementation, the client 110 may request the share update for the service provider 120, and the new share may not be communicated to the service provider 120. Accordingly, the service provider 120 may effectively be disenrolled and may no longer participate in the key recreation operations. In a further implementation, the disenrollment may be caused by updating one or more shares of the combiner 135. It should be noted that the encryption key of the private data stays constant, and thus the re-encryption of the stored data is unnecessary.

In another implementation (not shown in FIG. 1), it may be beneficial to include multiple interchangeable trust authorities in the privacy policy because some of these trust authorities may not be available online all the time or have limited connectivity. Thus, by including multiple trust authorities in a privacy policy, the service provider 120 can switch from one trust authority to another trust authority based on need, and thereby the risk of business disruptions and delays caused by an unresponsive trust authority may be greatly reduced.

The trust authority 130 includes a communication module 132, a policy engine 134, a cryptographic module 136, an audit module 138, and a data store 139. The communication module 132 communicates with the client 110 and the service provider 120 through the network 140. Example communications include receiving from the service provider 120 sticky policies and assurance messages, transmitting to the service provider 120 cryptographic keys or requests for the assurance messages, and exchanging messages with the client 110 regarding privacy policies, private data, and/or the audit trail.

Upon receiving a sticky policy, the policy engine 134 works with the cryptographic module 136 to verify the integrity of the privacy policy in the sticky policy, interprets the privacy policy (e.g., according to a set of predetermined grammar rules and/or semantics rules) to determine whether the privacy policy is valid and the necessary assurance required from the service provider 120 before access to the associated private data can be granted. If the privacy policy is valid and compliance assurance is needed from the service provider 120, the policy engine 134 works with the communication module 132 to transmit a request for assurance. Upon receiving an assurance message, the policy engine 134 interprets the privacy policy and the assurance message to determine whether the message is acceptable (e.g., whether information in the assurance message satisfies all the conditions in the privacy policy), and if acceptable then works with the cryptographic module 136 to transmit a cryptographic key to the service provider 120. Whether or not the policy engine 134 is satisfied with the assurance message, the audit module 138 generates an audit record comprising the identities of the client 110 and the service provider 120, the identity of (or a reference to) the associated private data, and the information used to satisfy—or failing to satisfy—each policy condition. This audit record is stored to provide an audit trail regarding the disclosure of the private data and attempted accesses to it.

Alternatively or in addition, the trust authority 130 may comprise a destruction engine to delete the cryptographic key and the shares.

The network 140 is configured to connect the client 110, the service provider 120, and the trust authority 130. The network 140 may be a wired or wireless network. Examples of the network 440 include the Internet, an intranet, a Wi-Fi network, a WiMAX network, a mobile telephone network, or a combination thereof.

In one implementation, the network environment 100 includes a storage that provides a storage service to users (e.g., the client 100) in the network environment 100. Users such as the owner of the private data can store data using the storage service and share the stored data with others. Similar to the service provider 120, the functions of the storage can be implemented by one or more computer systems or in a cloud computing environment. The encrypted data in the storage can be retrieved using a reference (e.g., a uniform resource locator (URL)) that uniquely identifies the encrypted data.

The described implementations can also be configured to support additional or alternative transmission mechanisms among entities such as the client 110, the service provider 120, the trust authority 130, and/or the storage. For example, in the scenario without the storage, instead of transmitting the encrypted data and the sticky policy to the service provider 120 through the network 140, the client 110 (or the communication module 116) can store the encrypted data and the sticky policy onto a non-transitory computer-readable storage medium such as a hard drive, and physically ship (or deliver) the storage medium to the service provider 120. The service provider 120 can then retrieve the sticky policy by reading the storage medium, and transmit the sticky policy and an assurance message to an acceptable trust authority 130 through the network 140. As another example, in the scenario with the storage, the client 110 can ship to the storage a hard drive hosting the encrypted data, and, after the encrypted data become available at the storage, transmit an encrypted reference to the encrypted data along with a sticky policy to the service provider 120 through the network 140. Further, some or all functions of the trust authority 130 can be provided by trusted applications hosted on entities such as the service provider 120, or by applications transmitted along with the sticky policy (e.g., stored in the storage medium that hosts the sticky policy and is shipped to the service provider 120).

The described implementations may allow tracing and auditing within the network environment via the trust authority 130 and may ensure enforcement of user privacy preferences by the service provider 120. In addition, the described implementations may provide flexibility as they enable multiple ways in which interactions could happen, which may be important to cloud computing environments where multiple interaction models might happen. Example variations include: (1) the user deciding whether to disclose encrypted data directly to the service provider 120 or instead to the storage in encrypted form, (2) the user deciding which and how many trust authorities to use, and (3) the trust authority 130, in case encrypted private data is stored in the storage, fetches the encrypted data from the storage and sends the encrypted data to the service provider 120 along with the cryptographic key.

Figure 2:
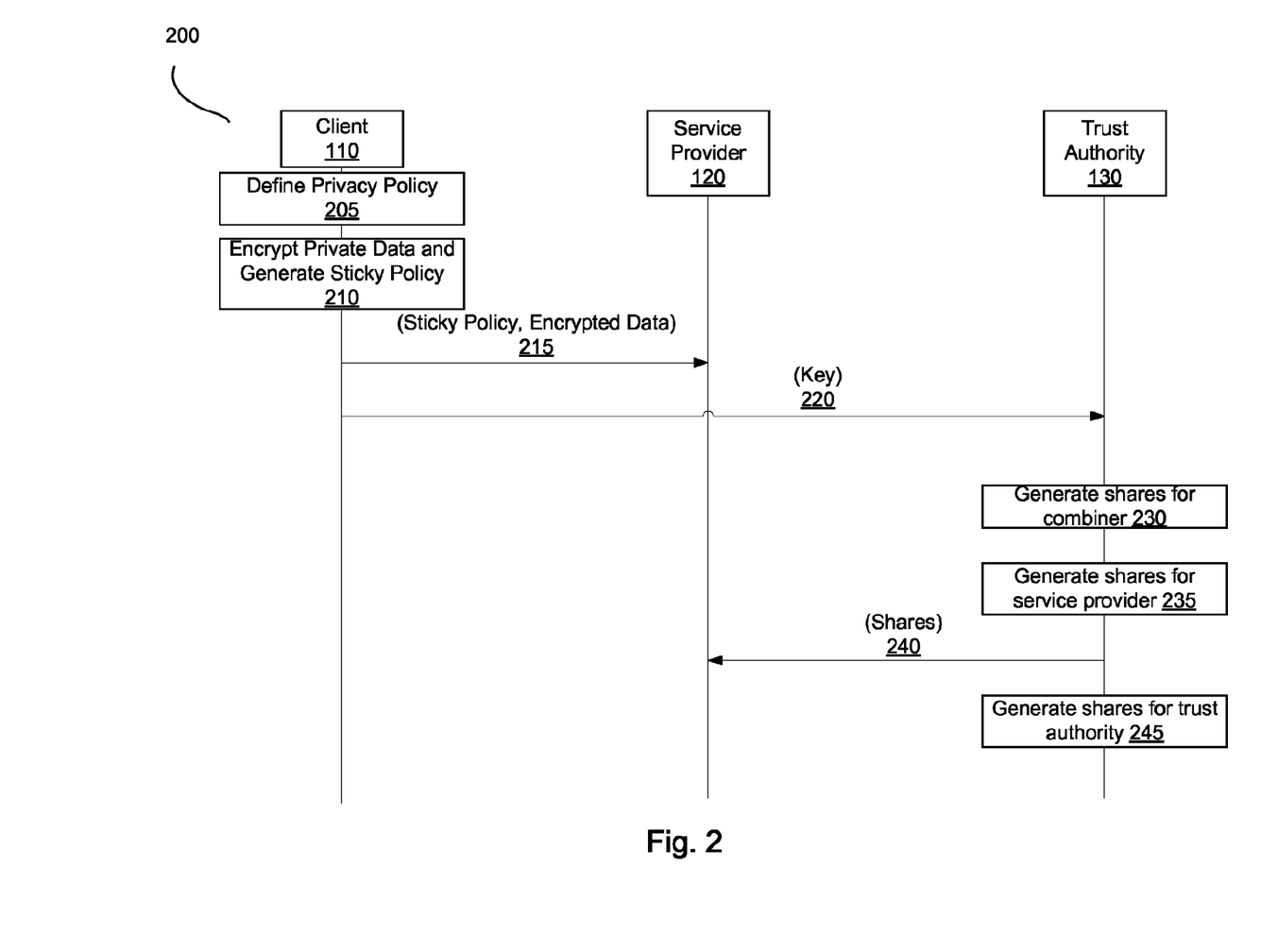
FIG. 2 illustrates an example ladder diagram of an example method of a storage protocol in accordance with an implementation.

FIG. 2 illustrates a ladder diagram showing an example of a method 200 of implementing a storage protocol in the network environment 100. Other examples perform the steps in different orders and/or perform different or additional steps than the ones shown. It should be readily apparent that the method 200 illustrated in FIG. 2 represents an exemplary depiction and that other steps may be added or existing steps may be removed, modified, or rearranged without departing from a scope of the present disclosure.

The client 110 defines 205 a privacy policy for private data, encrypts 210 the private data residing thereon using a symmetric key, and generates 210 a sticky policy to bind the private data and the privacy policy together. Thereafter, the client 110 transmits 215 the policy in clear text, an encrypted copy of the private data along with the sticky policy (e.g., a signature of a cryptographic hash of the policy and the key) to the service provider 120. As described herein, the client 110 may define multiple privacy policies that set forth different conditions for treating different attributes of the private data. The attributes subject to different privacy policies are encrypted using different symmetric keys, and multiple sticky policies are created for the private data. Upon receiving the encrypted data and the sticky policy, the service provider 120 optionally verifies and interprets the privacy policy enclosed in the sticky policy. In addition, the client 110 sends 220 an encrypted copy of the key to the trust authority 130. This process may involve encrypting the key using a public key associated with the trust authority 130.

Upon receiving the key, the trust authority 130 generates shares of the key for the combiner 135 and transmits 230 them to the combiner 135. Further, the trust authority 130 generates shares 235 for the service provider 120 and transmits 240 the shares via a secure channel to the service provider 120. In one implementation, this process may involve the trust authority encrypting the shares using a public key associated with the service provider 120. Further, the trust authority 130 generates shares 245 for itself and stores the shares securely.

Figure 3:
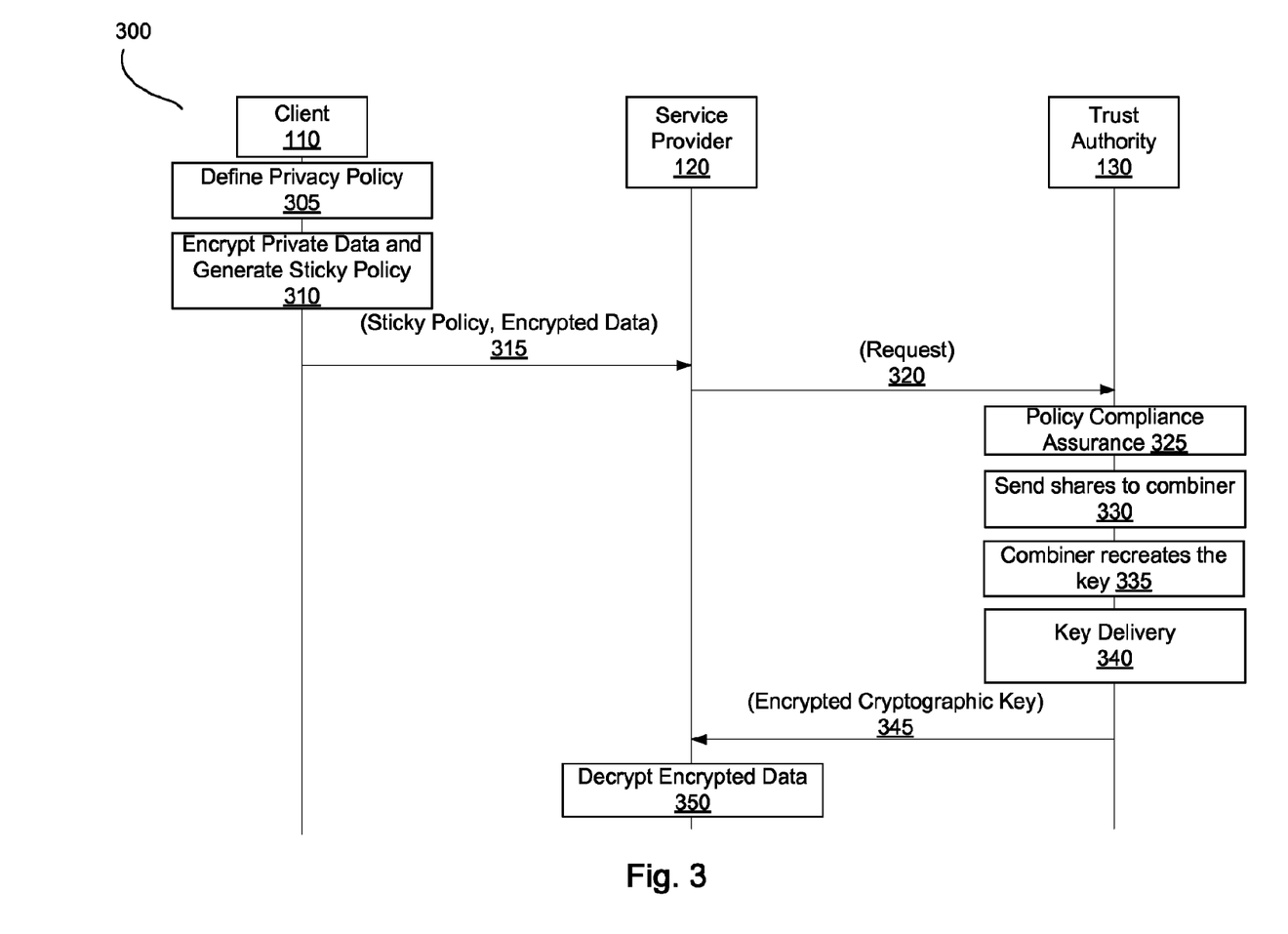
FIG. 3 illustrates an example ladder diagram of an example method of retrieval protocol in accordance with an implementation and FIG. 4 illustrates an example diagram of an example computer system in accordance with an implementation.

FIG. 3 illustrates a ladder diagram showing an example of a method 300 of implementing a retrieval protocol in the network environment 100. Other examples perform the steps in different orders and/or perform different or additional steps than the ones shown. It should be readily apparent that the method 300 illustrated in FIG. 3 represents an exemplary depiction and that other steps may be added or existing steps may be removed, modified, or rearranged without departing from a scope of the present disclosure.

As described in detail above in reference to FIG. 2, the client 110 defines 305 a privacy policy for private data, encrypts 310 the private data residing thereon using a symmetric key, and generates a sticky policy to bind the private data and the privacy policy together. Thereafter, the client 110 transmits 315 the policy in clear text, an encrypted copy of the private data along with the sticky policy (e.g., a signature of a cryptographic hash of the policy and the key) to the service provider 120.

The service provider 120 requests 320 the secret key from the trust authority 130 to access an asset. The service provider 120 provides the shares associated with the service provider 120 via a secure channel. In one implementation, the service provider 120 encrypts the shares with a public key associated with the trust authority 130 and transmits the encrypted shares to the trust authority 130.

In one implementation, the trust authority 130 verifies and interprets 325 the privacy policy. In particular, this step may involve challenging the service provider 120 and transmitting to the service provider 120 a request for assurance. In response, the service provider 120 may need to provide signed statements about its policies. In some implementations, if the assurance message from the service provider 120 to the trust authority 130 is not acceptable, this step may be repeated once or multiple times. If the assurance message is acceptable, the trust authority 130 sends 330 the shares for the trust authority 130 and for the service provider 120 to the combiner 135. In one implementation, the trust authority 130 may have a module to store the shares associated with the trust authority 130. This module may also handle the logic validation (e.g., interpreting associated constraints and policies on how to recombine shares and the circumstances this recombination process may proceed) for the trust authority 130. The module may be set to transmit the shares associated with the trust authority 130 to the combiner 135 only if the validation is successful.

In response, the combiner 135 recreates 335 the key. For the recreation of the key, the combiner 135 utilizes the shares associated with the combiner 135, the shares from the trust authority 130 and the shares from the service provider 120. Once the key is recreated, the combiner 135 returns 340 the key to the trust authority 130 via a secure channel. In one implementation, this process may further involve the combiner 135 deleting its copy of the shares associated with the combiner 135.

Once the trust authority 130 receives the recreated key, the trust authority 130 returns 345 the recreated key to the service provider 120. In addition, the trust authority 130 performs an audit on the service provider 120 to confirm whether the service provider 120 1) is following the policy for the specific asset, 2) is destroying (e.g., deleting) any plain-text copy of the asset after processing of the asset is complete, and/or 3) is destroying any copies of the secret key after processing of the asset is complete.

As a result, the service provider 120 gains access to the key, and then decrypts 350 the private data. In addition, the service provider 120 checks whether the policy belongs to the asset. In particular, this process may involve validating the digital signature on the policy/key mapping. The service provider 120 processes the asset in accordance with the policy. In addition or alternatively, the trust authority 130 may destroy (e.g., delete) via a destruction engine the local copy of the key in addition to the generated combiner shares, and the service provider 120 may destroy its share.

In another implementation of the network environment 100, there may be a plurality of trust authorities, and a user may compute the shares. In such implementation, the client 110 generates a key and encrypts the user's private data with the key, and the client 110 may not need to send a sticky policy that includes a digital signature generated by the client 110 on the policies and the trust authority 130 with the private key and the key encrypted with the public key for each of the authorized trust authorities. Instead, the user sends a signed copy of the sticky policy, and shares the key where the authorized trust authorities are members of authorized subsets.

When the service provider 120 needs to access the private data, it sends the relevant sticky policy to one of the authorized trust authorities listed in policy—received from the client 110, and includes the service provider 120's share. The trust authorities then check the signature on the policy to verify that the policy is authentic. In the event that it is authentic, the trust authorities further verify that the service provider 120 fulfills the conditions specified in the policy. If they are verified, the combiner 135, as a part of the trust authority, recreates the symmetric key and provides the service provider 120 with the key, encrypted with the service provider's public key. In one implementation, the combiner 135 may be chosen by a trust authority. The service provider can then use its private key to decrypt the symmetric key and decrypt the private data.

In one implementation, while they are a plurality of trust authorities, some of the two trust authorities may not be fully trusted. In such embodiment, the client 110 may need to modify the access structures so that at least two trust authorities have to participate in the recreation process, which allows for the service provider to recover the key and decrypt the private data, while still providing for some redundancy among trust authorities and at the same time allowing the trust authorities to audit each other's recreation attempts. However, it should be noted that the trust authorities are still trusted to destroy shares (e.g., shares from the service provider) as well as the key after a successful recreation.

Figure 4:
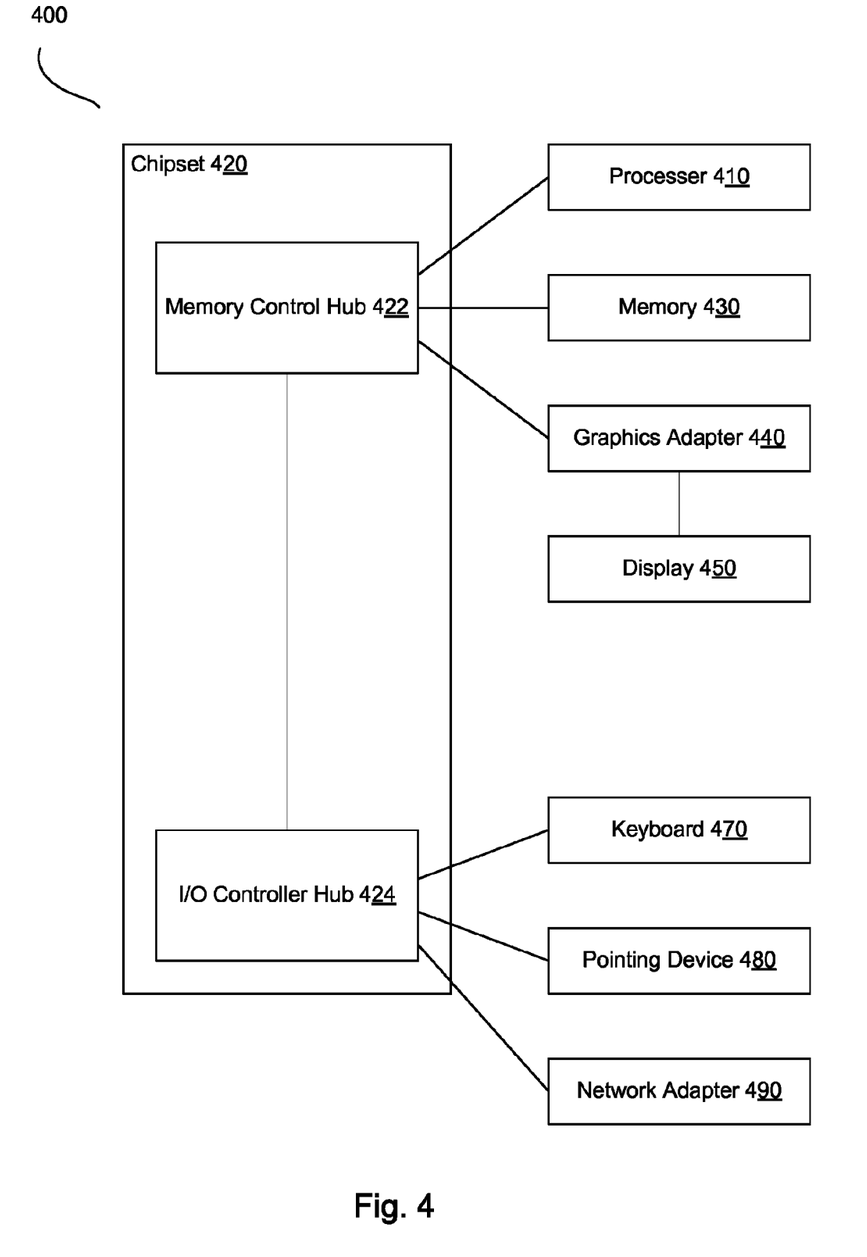

In one example, the entities shown in FIGS. 1-2 are implemented using one or more computer systems. FIG. 4 illustrates a block diagram illustrating aspects of a computer system 400 in accordance with an implementation. It should be readily apparent that the computer system 400 illustrated in FIG. 4 represents an exemplary depiction and that other components may be added or existing components may be removed, modified, or rearranged without departing from a scope of the present disclosure. The computer system 400 comprises a processor 410, a chipset 420, a machine readable medium 430 encoded with instructions, and a graphics adapter, each of which is described in greater detail below. The chipset 420 includes a memory controller hub 422 and an input/output (I/O) controller hub 424. The computer system 400 further comprises a display 450 coupled to a graphics adapter 440, a keyboard 470, a pointing device 480, and a network adapter 490 that are coupled to the I/O controller hub 424. The components of the computer may be connected via buses. The computer 400 may be any of a variety of computing devices, such as a workstation computer, a desktop computer, a laptop computer, a tablet or slate computer, a server computer, or a smart phone, among others.

The processor 410 may retrieve and execute instructions stored in the machine readable medium 430. The processor 410 may be, for example, a central processing unit (CPU), a semiconductor-based microprocessor, an application specific integrated circuit (ASIC), a field-programmable gate array (FPGA) configured to retrieve and execute instructions, other electronic circuitry suitable for the retrieval and execution instructions stored on a computer readable storage medium, or a combination thereof. The processor 410 may fetch, decode, and execute instructions stored on the machine readable medium 430 to operate the computer system 400 in accordance with the above-described examples. The machine readable medium 430 may be a non-transitory computer-readable medium that stores machine readable instructions, codes, data, and/or other information. The instructions, when executed by processor 410 (e.g., via one processing element or multiple processing elements of the processor) can cause processor 410 to perform processes described herein.

In certain implementations, the machine readable medium 430 may be integrated with the processor 410, while in other implementations, the machine readable medium 430 and the processor 410 may be discrete units.

Further, the computer readable medium 430 may participate in providing instructions to the processor 410 for execution. The machine readable medium 430 may be one or more of a non-volatile memory, a volatile memory, and/or one or more storage devices. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices.

The computer system 400 is adapted to execute computer program modules for providing functionality described herein. As used herein, the term "module" refers to computer program logic used to provide the specified functionality. Thus, a module can be implemented in hardware, firmware, and/or software. In one implementation, the machine readable storage medium (media) may have instructions stored thereon/in which can be used to program the computer system 400 to perform any of the processes of the implementations described herein. In one implementation, program modules are stored/loaded into the memory 430, and executed by the processor 410.

The pointing device 480 is a mouse, track ball, or other type of pointing device, and is used in combination with the keyboard 470 to input data into the computer system 400. The graphics adapter 440 displays images and other information on the display 450. The network adapter 490 couples the computer system 400 to one or more computer networks.

The present disclosure has been shown and described with reference to the foregoing exemplary implementations. It is to be understood, however, that other forms, details, and examples may be made without departing from the spirit and scope of the disclosure that is defined in the following claims. As such, all examples are deemed to be non-limiting throughout this disclosure.

What is claimed is:

1. A method for managing data in a computer network environment, comprising:
   executing a storage protocol, comprising:
   receiving, by a service provider and from a user in the computer network environment, a sticky policy comprising:
   a privacy policy describing permissible use of a piece of data,
   an encrypted copy of the piece of data, and
   a signature of:
   a cryptographic hash of the privacy policy, and
   a cryptographic key; and
   receiving a first cryptographic key partition sent from a trust authority to the service provider, wherein the first cryptographic key partition is one of a plurality of cryptographic key partitions and is associated with the service provider, and wherein the first cryptographic key partition comprises a portion of the cryptographic key that has been partitioned from the cryptographic key by the trust authority;
   executing a retrieval protocol, comprising:
   transmitting a request from the service provider to the trust authority requesting the cryptographic key to decrypt the piece of data;
   transmitting an encrypted copy of the first cryptographic key partition from the service provider to the trust authority;
   receiving, at the service provider and from the trust authority, the cryptographic key, wherein the cryptographic key was recreated by a combiner using:
   a pre-defined set of cryptographic key partitions, including:
   the first cryptographic key partition, which is associated with the service provider, and which was decrypted from the encrypted copy transmitted to the trust authority,
   a second cryptographic key partition, which is associated with the trust authority, and
   a third cryptographic key partition, which is associated with the combiner; and decrypting, by the service provider, the encrypted copy of the piece of data using the received cryptographic key.

2. The method of claim 1, wherein transmitting the encrypted copy of the first cryptographic key partition further comprises encrypting the first cryptographic key partition using a public key associated with the trust authority.

3. The method of claim 1, wherein the cryptographic key received from the trust authority is encrypted using a public key associated with the service provider.

4. The method of claim 1, further comprising destroying the piece of data and the cryptographic key.

5. The method of claim 1, further comprising transmitting to the trust authority a message comprising a first statement that the privacy policy will be followed by the service provider in treating the piece of data.

6. The method of claim 5, further comprising:
   receiving from the trust authority, after transmitting to the trust authority the first message, a request for additional assurance for at least one condition in the privacy policy; and
   transmitting a different message comprising a second statement that the at least one condition will be followed by the service provider in treating the piece of data, wherein a second encrypted copy of the cryptographic key is received at least in part in response to transmitting the different message.

7. The method of claim 5, wherein the privacy policy comprises a plurality of conditions for treating the piece of data, the first statement claims that all of the plurality of conditions in the privacy policy will be complied with by a service provider.

8. A system for managing data in a computer network environment, the system including a service provider comprising:
   a processor; and
   a memory storing instructions that, when executed by the processor, cause the processor a processing circuitry to:
   execute a storage protocol, comprising:
   receive via the computer network environment a sticky policy comprising:
   a privacy policy describing permissible use of a piece of data,
   an encrypted copy of the piece of data, and
   a signature of:
   a cryptographic hash of the privacy policy, and
   a cryptographic key, and
   receive a first cryptographic key partition sent from a trust authority to the service provider, wherein the first cryptographic key partition is one of a plurality of cryptographic key partitions and is associated with the service provider, and wherein the first cryptographic key partition comprises a portion of the cryptographic key that has been partitioned from the cryptographic key by the trust authority;
   execute a retrieval protocol, comprising:
   request from the trust authority the cryptographic key to decrypt the piece of data,
   transmit the first cryptographic key partition to the trust authority, and
   receive from the trust authority the cryptographic key, wherein the cryptographic key was recreated by a combiner using:
   a pre-defined set of cryptographic key partitions, including:
   the share first cryptographic key partition, which is associated with the service provider, which is sufficient, in combination with a share associated with the trust authority and a share associated with a combiner, to recreate the cryptographic key, a second cryptographic key partition, which is associated with the trust authority, and a third cryptographic key partition, which is associated with the combiner; and decrypt the encrypted copy of the piece of data using the received cryptographic key.

9. The system of claim 8, executing the retrieval protocol further comprising deleting the cryptographic key and the first cryptographic key partition.

10. The system of claim 8, wherein the service provider receives a message stating that the privacy policy will be followed by a different service provider in treating the piece of data.

11. A non-transitory computer-readable medium comprising instructions that cause a processing circuitry to:

upon receiving a cryptographic key from a user, generate, at a trust authority, a plurality of cryptographic key partitions, wherein each cryptographic key partition of the plurality of cryptographic key partitions comprises a portion of the cryptographic key and is a member of one of a pre-defined set of combinations, each of which is sufficient to recreate the cryptographic key, the plurality of cryptographic key partitions including:

a first cryptographic key partition, which is associated with a service provider, a second cryptographic key partition, which is associated with the trust authority, and a third cryptographic key partition, which is share associated with a combiner, wherein each share of the plurality of shares comprises a portion of the cryptographic key and each share is a member of at least one of a plurality of pre-determined sets of shares to recreate the cryptographic key;

transmit, from the trust authority to the combiner, the third cryptographic key partition;

transmit, from the trust authority to the service provider, the first cryptographic key partition;

receive, from the service provider, the first cryptographic key partition and a request for the cryptographic key;

responsive to the request for the cryptographic key:

transmit, from the trust authority to the combiner, the first cryptographic key partition and the second cryptographic key partition;

receive, from the combiner, the cryptographic key, recreated from at least:

the first cryptographic key partition share associated with the service provider;

the second cryptographic key partition; and the third cryptographic key partition; and transmit the cryptographic key to the service provider.

12. The method of claim 1, wherein each of the pre-defined set of combinations are sufficient to recreate the cryptographic key.

13. The method of claim 1, wherein requesting the cryptographic key comprises transmitting the sticky policy to the trust authority.

14. The system of claim 8, wherein the first cryptographic key partition is a member of one of the pre-defined set of combinations, each sufficient to recreate the cryptographic key.

15. The computer-readable medium of claim 11, comprising the processing circuitry to further:

receive, from the user, a request to generate a fourth cryptographic key partition associated with a second service provider;

generate a different plurality of cryptographic key partitions, wherein each cryptographic key partition of the different plurality of cryptographic key partitions comprises a portion of the cryptographic key and is a member of one of the pre-defined set of combinations, each of which is sufficient to recreate the cryptographic key, the plurality of cryptographic key partitions including:

the fourth cryptographic key partition, which is associated with the second service provider, a fifth cryptographic key partition, which is associated with the trust authority, and a sixth cryptographic key partition, which is associated with the combiner;

transmit, to the combiner, the sixth cryptographic key partition; and wherein the share associated with the service provider, the new share associated with the trust authority, and a new share associated with the combiner are members of at least one of the plurality of pre-determined sets of shares to recreate the cryptographic key, and wherein the new share associated with the second service provider, the new share associated with the trust authority, and the new share associated with the combiner are members of at least one of the plurality of pre-determined sets of shares to recreate the cryptographic key; and transmit, to the second service provider, the fourth cryptographic key partition.

16. The computer-readable medium of claim 11, wherein at least one of the pre-defined set of combinations comprises fewer cryptographic key partitions than a number of total cryptographic key partitions generated by the trust authority.

* * * * *